United States Patent
Sellers

(10) Patent No.: US 8,998,219 B1
(45) Date of Patent: Apr. 7, 2015

(54) COLLAPSIBLE LAUNDRY CART

(71) Applicant: Beverly Sellers, Dallas, TX (US)

(72) Inventor: Beverly Sellers, Dallas, TX (US)

( * ) Notice: Subject to any disclaimer, the term of this patent is extended or adjusted under 35 U.S.C. 154(b) by 0 days.

(21) Appl. No.: 14/059,637

(22) Filed: Oct. 22, 2013

(51) Int. Cl.
*B62B 3/02* (2006.01)
*D06F 95/00* (2006.01)

(52) U.S. Cl.
CPC .............. *D06F 95/002* (2013.01); *B62B 3/022* (2013.01)

(58) Field of Classification Search
CPC .............................. D06F 95/002; B62B 3/022
USPC ........... 280/35, 649, 47.35, 79.11, 79.2, 79.7, 280/638
See application file for complete search history.

(56) References Cited

U.S. PATENT DOCUMENTS

| | | | | |
|---|---|---|---|---|
| 1,081,221 A | * | 12/1913 | Durkin ........................... | 280/641 |
| 1,310,669 A | * | 7/1919 | Morgan .......................... | 220/9.3 |
| 2,625,973 A | * | 1/1953 | Weldon et al. .............. | 206/459.5 |
| 2,658,641 A | * | 11/1953 | Pellerin .............................. | 217/7 |
| 2,797,102 A | * | 6/1957 | Adams ............................. | 280/30 |
| 3,286,752 A | * | 11/1966 | Duryee, Jr. ....................... | 220/9.3 |
| 3,310,089 A | * | 3/1967 | Silverman ........................ | 312/35 |
| 3,410,328 A | * | 11/1968 | Sasai ................................. | 220/9.2 |
| 3,603,367 A | * | 9/1971 | Lehrman ......................... | 220/9.3 |
| 3,608,600 A | * | 9/1971 | Lehrman ......................... | 248/150 |
| 3,659,816 A | * | 5/1972 | Wilson ............................. | 248/97 |
| 4,180,113 A | * | 12/1979 | Liebling ............................ | 383/7 |
| 4,248,442 A | * | 2/1981 | Barrett ....................... | 280/33.998 |
| 4,299,365 A | * | 11/1981 | Battle ............................... | 248/99 |
| D279,038 S | * | 5/1985 | Thompson, Jr. ................ | D32/37 |
| 4,585,283 A | * | 4/1986 | Redmon et al. ................ | 312/258 |
| 4,646,802 A | * | 3/1987 | Basore et al. ................... | 220/9.4 |
| 4,714,224 A | * | 12/1987 | Calmes .......................... | 248/465 |
| 4,789,078 A | * | 12/1988 | Miller et al. ................... | 220/832 |
| 4,821,903 A | * | 4/1989 | Hayes ......................... | 280/47.26 |
| 4,826,187 A | * | 5/1989 | Abbott et al. .................... | 280/35 |
| 4,948,077 A | * | 8/1990 | Gonzalez ....................... | 248/129 |
| 4,981,232 A | * | 1/1991 | Wynn ............................. | 220/532 |
| 4,989,749 A | * | 2/1991 | Choi .......................... | 280/47.34 |
| 5,048,712 A | * | 9/1991 | Wolters .......................... | 220/262 |
| 5,118,173 A | * | 6/1992 | Proctor et al. ................ | 312/213 |
| 5,154,359 A | * | 10/1992 | Junta et al. ..................... | 280/79.2 |
| D336,696 S | * | 6/1993 | Bateman et al. ................ | D32/37 |
| 5,263,672 A | * | 11/1993 | He .................................... | 248/97 |
| 5,356,024 A | * | 10/1994 | Ho et al. ......................... | 220/9.2 |
| 5,381,574 A | * | 1/1995 | VonPless ........................ | 8/149.2 |
| 5,427,394 A | * | 6/1995 | Lauto .......................... | 280/47.35 |
| 5,461,887 A | * | 10/1995 | VonPless ....................... | 68/18 F |
| 5,464,113 A | * | 11/1995 | Ho et al. ......................... | 220/9.2 |
| 5,474,196 A | * | 12/1995 | Fausel et al. ................. | 220/4.28 |
| 5,511,807 A | * | 4/1996 | Snyder ........................ | 280/47.26 |
| 5,544,781 A | * | 8/1996 | Mattesky ........................ | 220/9.4 |
| 5,622,277 A | * | 4/1997 | Van Giezen et al. ............. | 220/6 |
| 5,667,066 A | * | 9/1997 | Simpson ........................ | 206/278 |
| 5,671,858 A | * | 9/1997 | Hsu .................................. | 220/9.2 |
| 5,833,336 A | * | 11/1998 | Dean .......................... | 312/293.2 |
| 5,941,405 A | * | 8/1999 | Scales et al. ................... | 220/1.5 |
| 5,967,342 A | * | 10/1999 | Steffine ....................... | 211/85.24 |
| 5,975,101 A | * | 11/1999 | Zheng ............................ | 135/125 |
| 6,019,445 A | * | 2/2000 | Gades ............................ | 312/245 |
| 6,089,394 A | * | 7/2000 | Ziglar ............................... | 220/6 |
| D461,638 S | * | 8/2002 | Kellogg et al. ................ | D3/304 |

(Continued)

*Primary Examiner* — Hau Phan
*Assistant Examiner* — Jacob Meyer

(57) ABSTRACT

A collapsible cart comprising primary and multiple secondary storages spaces. The collapsible cart comprises a bottom on which wheels are mounted and a collapsing frame, which permits the adjustment of cart height. There is also a lid that doubles as a handle to move the cart.

7 Claims, 5 Drawing Sheets

FIG. 1

(56) References Cited

U.S. PATENT DOCUMENTS

| | | | |
|---|---|---|---|
| 6,691,879 B1 * | 2/2004 | Alvarez | 211/175 |
| 6,752,414 B1 * | 6/2004 | Waldron et al. | 280/649 |
| 7,055,847 B2 * | 6/2006 | Miller et al. | 280/638 |
| 7,080,653 B2 * | 7/2006 | Zheng | 135/126 |
| 7,243,884 B2 * | 7/2007 | Lawson et al. | 248/95 |
| D551,452 S * | 9/2007 | Kellogg et al. | D3/304 |
| 7,328,905 B2 * | 2/2008 | Guirlinger | 280/47.19 |
| 7,390,011 B1 * | 6/2008 | Hem | 280/638 |
| 7,762,363 B1 * | 7/2010 | Hirschfeld | 180/65.1 |
| 7,997,590 B2 * | 8/2011 | Walters et al. | 280/35 |
| 8,100,280 B1 | 1/2012 | Hernandez | |
| 8,453,862 B2 * | 6/2013 | Wang | 220/23.4 |
| 8,602,243 B2 * | 12/2013 | Hunter | 220/6 |
| 8,702,111 B2 * | 4/2014 | Simoes | 280/33.998 |
| 8,727,172 B2 * | 5/2014 | Burgess et al. | 220/533 |
| 2004/0070179 A1 * | 4/2004 | Miller et al. | 280/651 |
| 2004/0217115 A1 | 11/2004 | Delery | |
| 2006/0157358 A1 * | 7/2006 | Heidel | 206/278 |

* cited by examiner

COLLAPSIBLE LAUNDRY CART

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of laundry carts, more specifically, a laundry cart that is collapsible.

B. Summary of the Invention

The Collapsible Laundry Cart is a cart intended to conveniently store and move laundry as well as laundry soaps and accessories. The Collapsible Laundry Cart comprises a solid base mounted on wheels or castors, a collapsible frame on which fabric is mounted to delineate multiple storage spaces and to contain the contents of those spaces. Finally, a lid is provided, which doubles as a handle to move the cart These together with additional objects, features and advantages of the Collapsible Laundry Cart will be readily apparent to those of ordinary skill in the art upon reading the following detailed description of the presently preferred, but nonetheless illustrative, embodiments when taken in conjunction with the accompanying drawings.

In this respect, before explaining the current embodiments of the Collapsible Laundry Cart in detail, it is to be understood that the Collapsible Laundry Cart is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the Collapsible Laundry Cart.

It is therefore important that the claims be regarded as including such equivalent construction insofar as they do not depart from the spirit and scope of the Collapsible Laundry Cart. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

In the drawings.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

In the specification and claims, the following definitions will be used:

Invention: refers to the Collapsible Laundry Cart.

Cart: A small vehicle that can be easily moved by a person. Detailed reference will now be made to the preferred embodiment examples which are illustrated in FIGS. 1-5.

Figure 1:
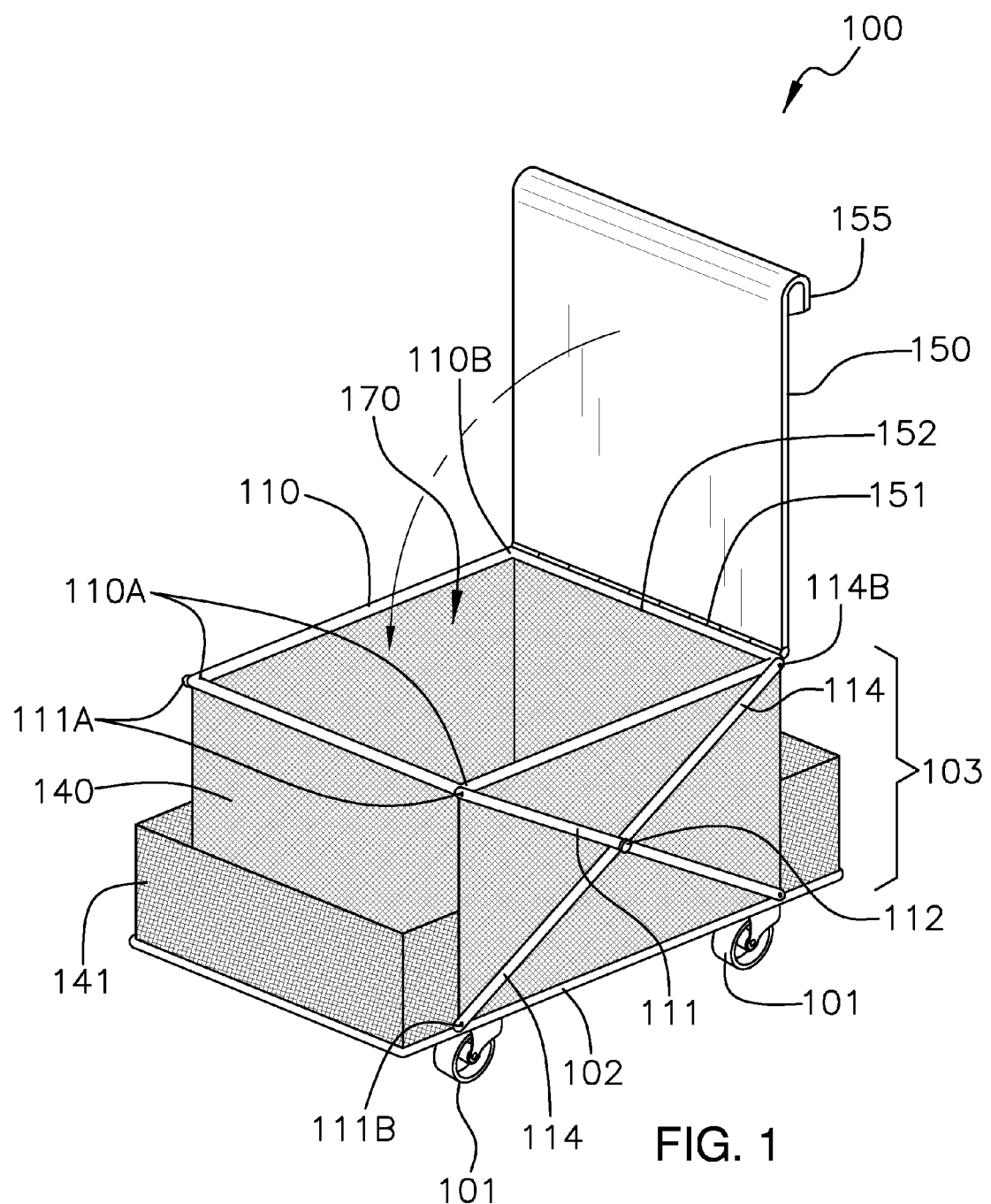
FIG. 1 is an isometric view of the Collapsible Laundry Cart (also referred to as the invention).
Figure 2:
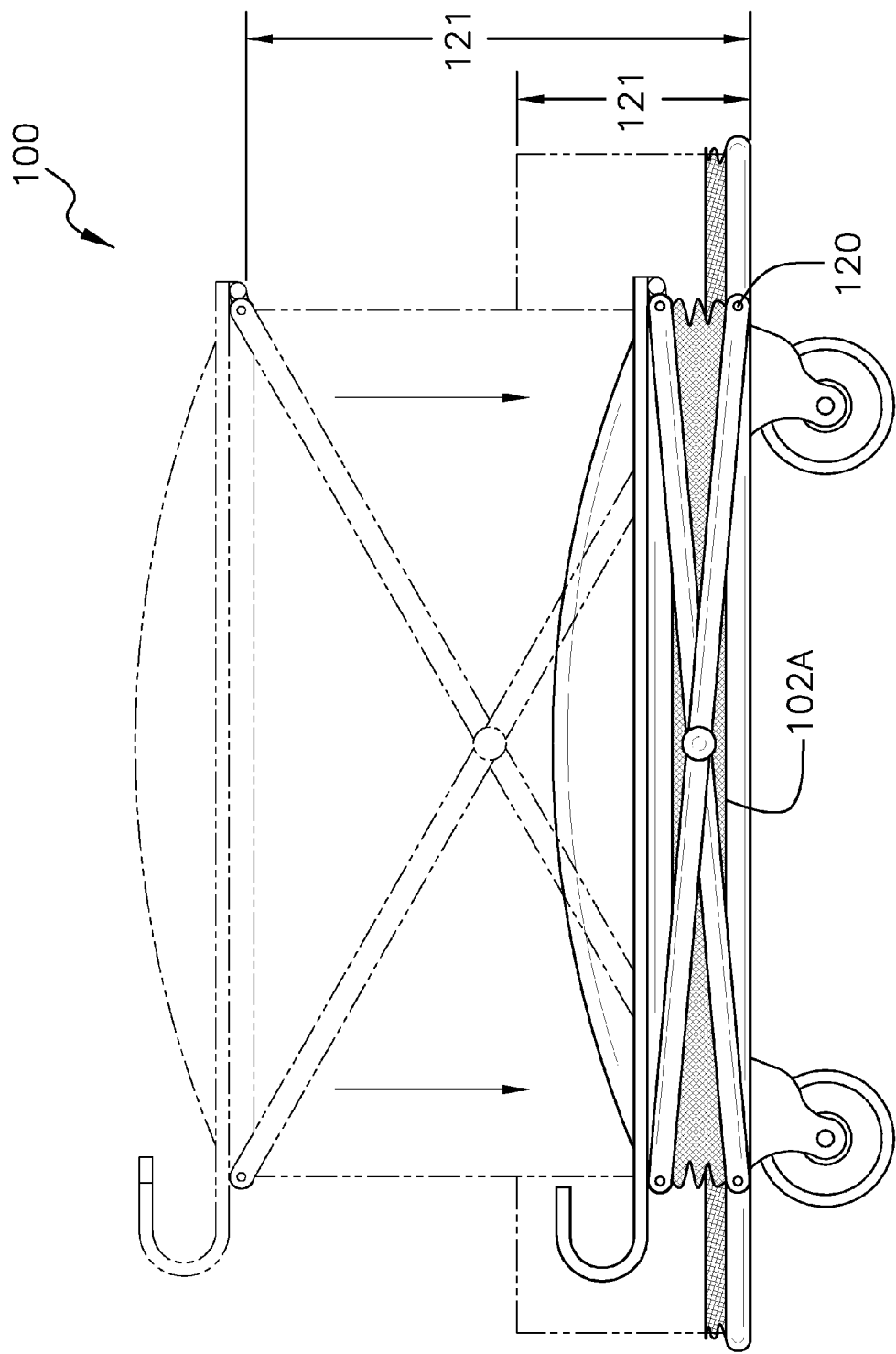
FIG. 2 is a side view of the invention.
Figure 3:
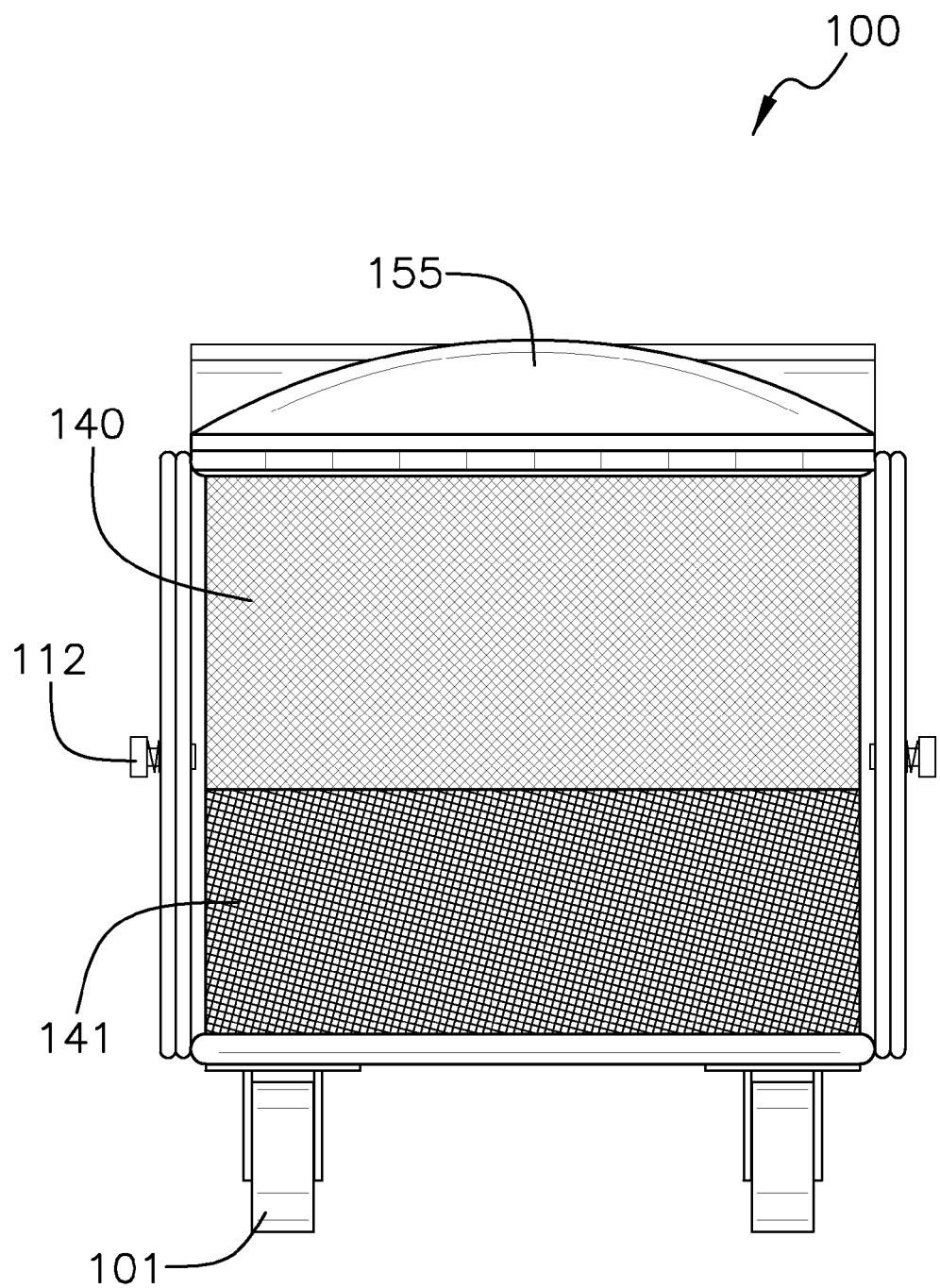
FIG. 3 is a back view of the invention.
Figure 4:
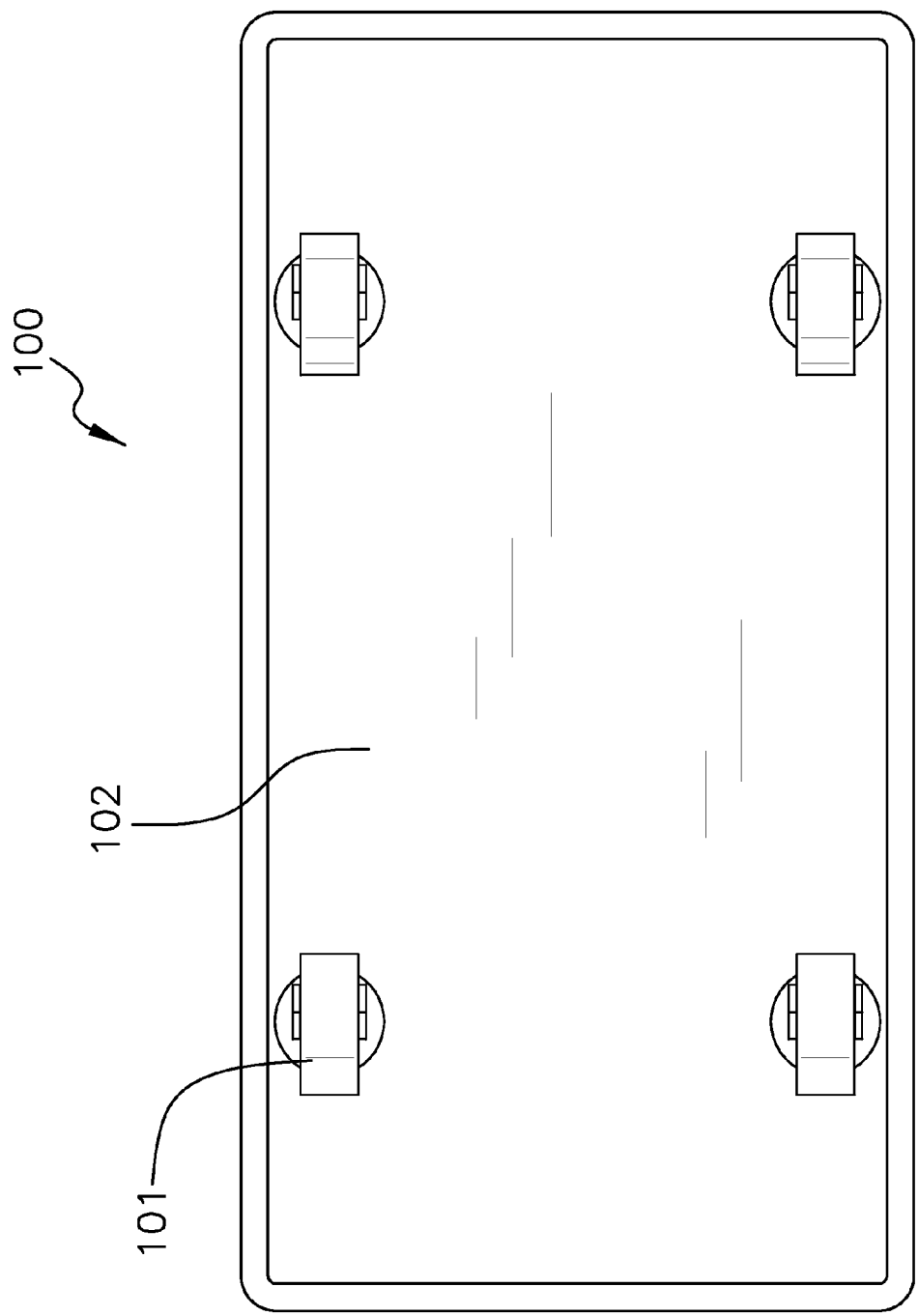
FIG. 4 is a bottom view of the invention.
Figure 5:
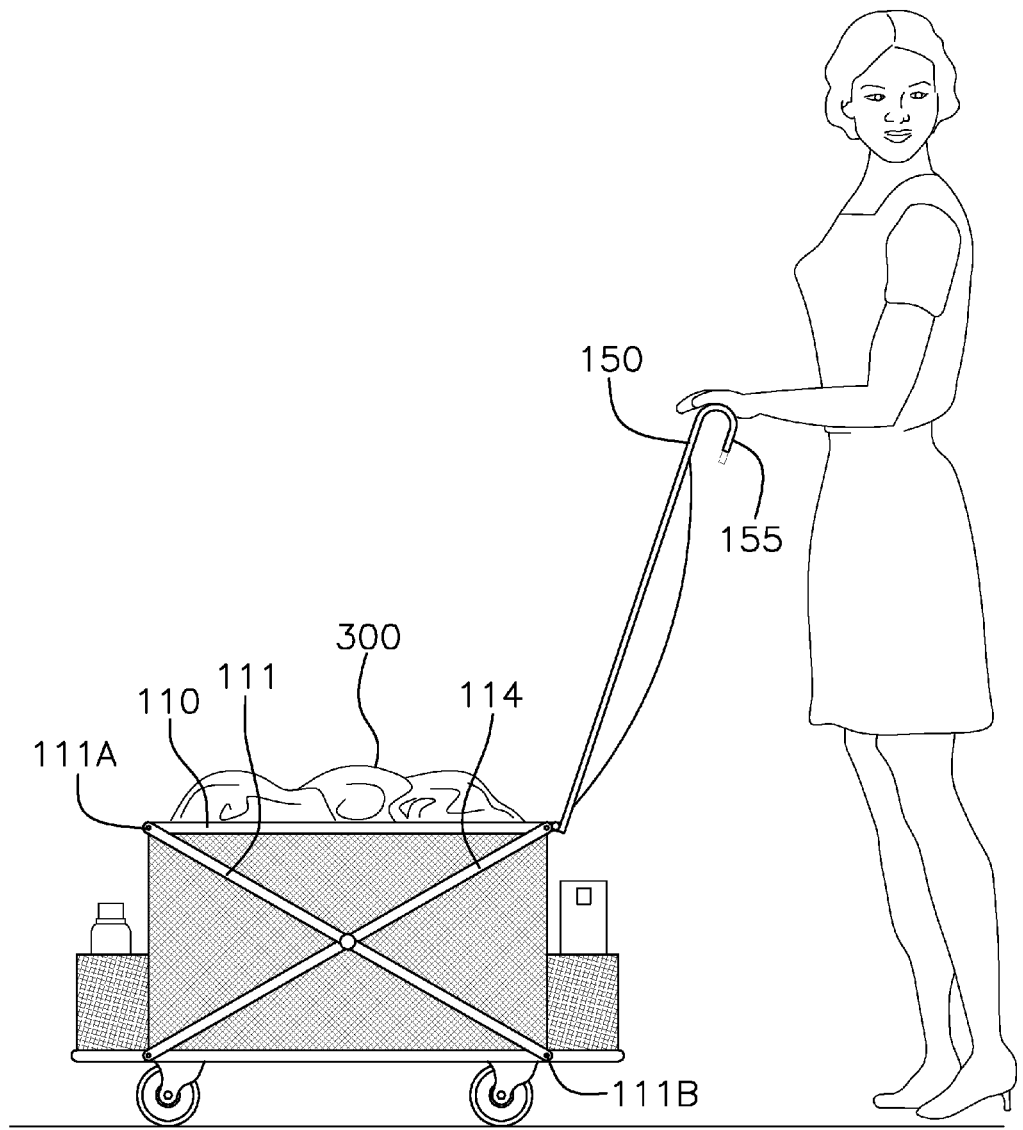
FIG. 5 is an in-use view of the invention.

As illustrated in FIGS. 1-5, the Collapsible Laundry Cart 100 (hereinafter invention) is a cart comprising: wheels 101 (FIGS. 1-4), a solid bottom 102 (FIG. 4), a collapsible frame 103 (FIGS. 1-3), a fabric basket 104 (FIGS. 1-3 and 5), fabric pockets 105 (FIGS. 1-3 and 5), and a hinged lid 106 (FIGS. 1-3). The hinged lid 106 also serves as a handle for moving the cart (FIG. 5).

The solid bottom 102 is simply a flat surface that can be made of any solid material. Examples of appropriate materials include, but are not limited to: wood, plastics or metal. The purposes of the solid bottom 102 are to provide a platform on which to assemble the rest of the invention 100 and to act as the bottom for the fabric basket and pockets. Underneath the solid bottom 102 are mounted wheels 101 or casters that allow the invention 100 to easily move. The collapsible frame 103 is mounted to a top surface 102A of the solid bottom 102.

The collapsible frame 103 has two purposes. First, it provides a structure for attaching the remaining components of the invention 100. Second, it defines the volumes that will eventually become the fabric basket and fabric pockets.

The collapsible frame 103 consists of a top rectangular structure 110, two crossing structural members 111 on each side of the invention 100 (4 total) and a locking mechanism 112 on each side of the invention 100 (2 total). On each side, two structural members 111 are connected front to back. Specifically, on each side, a first structural member 111 is attached at a first distal end 111A to a front portion 110A of the top rectangular structure 110 while a second distal end 111B of the first structural member 111 is attached to a back portion 110B of the solid bottom 102. On each side, a second structural member 114 is attached to the front portion 110A of the solid bottom 102 via a third distal end 114A while a fourth distal end 114B of the second structural member 114 is attached to the back portion 110B of the top rectangular structure (FIG. 2). Both the first structural member 111 as well as the second structure member 114 is each attached to the solid bottom 102 and top rectangular structure 110 with a pivot member 120.

On each side of the invention 100, where the two structural members cross, the locking mechanism 112 is used to connect the first structural member 111 to the second structural member 114. When locked, the locking mechanism 112 holds the first structural member 111 in place with respect to the second structural member 114. When the locking mechanism 112 is released, the pivot members 120 will adjust to allow a height 121 of the invention 100 to be reduced (collapse) for convenient storage.

When fabric 140 is attached to the top rectangular structure 110 and the solid bottom 102 of the invention 100, the fabric 140 forms the sides and is configured to store a plurality of laundry items 300 within a primary storage space 170 of the invention 100, called the basket. While any flexible fabric is suitable for this purpose, because of its permeable nature, mesh fabric is preferred for this embodiment.

Additional storage spaces, called pockets 180, are formed by attaching secondary fabric 141 to the solid bottom 102 and to the fabric 140 forming the sides of the basket. While any flexible fabric is suitable for this purpose, for aesthetic reasons as well as its permeable nature, mesh fabric is preferred for this embodiment.

An alternative method to form pockets 180 is to attach additional secondary fabric 141 to the fabric 140 forming the side of the basket. While any flexible fabric is suitable for this purpose, for aesthetic reasons as well as its permeable nature, mesh fabric is preferred for this embodiment.

A hinged lid 150 is mounted on the top rectangular structure 110. Once this is completed, the front and back of the invention 100 are defined with at least one hinge 151 being mounted on a back edge 152 of the top rectangular structure 110 of the invention 100. The hinged lid 150 has two purposes. One purpose is to act as a top for the fabric or mesh basket. The second is to act as a handle to conveniently move the invention 100. By selecting a hinge 151 with a range of motion greater than 90 degrees, a front edge 155 of the hinged lid 150 will act as a handle allowing the invention 100 to be moved more conveniently (FIG. 5). The hinged lid 150 may be a solid piece of wood, plastic or metal or can be a second rectangular structure similar to the top rectangular structure.

If a second rectangular structure is used as a lid, the option exists to use fabric to act as a cover for the basket. Any flexible fabric is suitable for this option.

With respect to the above description, it is to be realized that the optimum dimensional relationship for the various components of the invention described above and in FIGS. 1-5, include variations in size, materials8, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A laundry cart comprising:
    a solid bottom mounted on a plurality of wheels or casters;
    a plurality of storage spaces integrated into the laundry cart;
    an apparatus to adjust a height of the laundry cart such that said laundry cart is able to collapse when not in use;
    wherein a primary storage space is configured to store a plurality of items of laundry therein;
    wherein the apparatus to adjust the height of the cart comprises a rectangular structure, four structural members and two locking mechanisms;
    wherein the primary storage space is formed by attaching a primary fabric to the rectangular structure and to the solid bottom;
    wherein at least one of the plurality of storage spaces providing additional storage spaces is formed by attaching a second fabric to the solid bottom and to the primary fabric;
    wherein a lid is attached to the rectangular structure.

2. The cart of claim 1 wherein any of the additional storage spaces are formed by one of the following two ways:
    first, the space may be formed by attaching additional fabric to the solid bottom and to the primary fabric; or,
    second, the space may be formed by attaching additional fabric to the primary fabric.

3. The cart of claim 2 wherein the primary and additional fabrics are mesh fabrics.

4. The cart of claim 1 wherein a hinge secures the lid to the rectangular structure.

5. The cart of claim 4 wherein the hinge has a range of motion greater than 90 degrees.

6. The cart of claim 5 wherein the lid is configured to rotate from a horizontal orientation that shall cover the primary storage space to a vertical orientation as a handle.

7. The cart of claim 6 wherein the lid has a front edge, which acts as the handle to aid in maneuvering the laundry cart.

* * * * *